William W. Taylor
Richard O. Spencer
INVENTORS.

Oct. 10, 1961 W. W. TAYLOR ET AL 3,003,437
POWER DRIVEN ICE CREAM DISPENSER
Filed Aug. 12, 1959 2 Sheets-Sheet 2
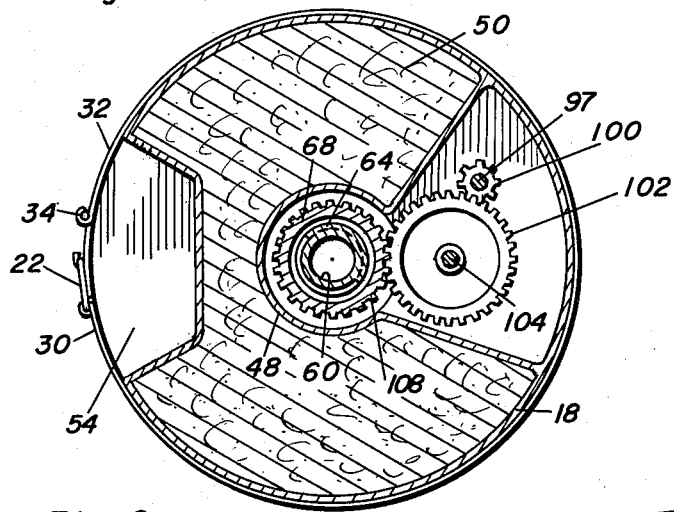
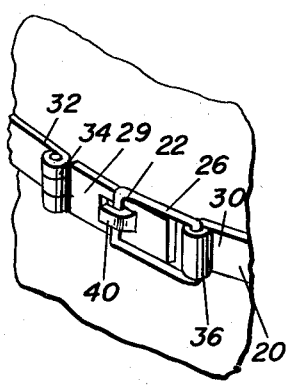
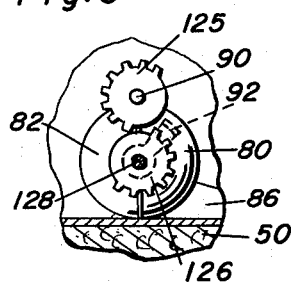
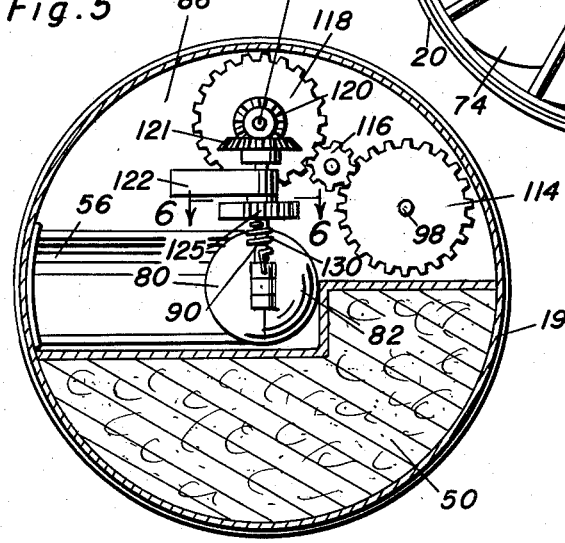
William W. Taylor
Richard O. Spencer
INVENTORS.

United States Patent Office 3,003,437
Patented Oct. 10, 1961

3,003,437
POWER DRIVEN ICE CREAM DISPENSER
William W. Taylor, 21830 Pacific Coast Highway, Malibu, Calif., and Richard O. Spencer, 640 Resalano Drive, Pacific Palisades, Calif.
Filed Aug. 12, 1959, Ser. No. 833,172
5 Claims. (Cl. 107—8)

This invention relates to dispensers and more particularly to a power-driven ice cream dispenser.

An object of the invention is to provide an ice cream dispenser capable of shaving ice cream packaged in bulk from the ice cream container and delivering the shaved ice cream to a compacting chamber at which it is compacted and shaped and delivered to an awaiting container of any type.

A further object of the invention is to provide an attachment for an ice cream container which enables ice cream to be withdrawn from the container, shaped and then delivered much more rapidly than is now possible by a manual ice cream scoop. Further, the ice cream portions that are delivered from the attachment are each of similar size and shape.

A further object of the invention is to provide an ice cream dispenser which delivers ice cream at a uniform rate to a compaction chamber by effort on the part of the user entailing merely the closing of a switch so that the formation of the ice cream portions may be said to require no effort on the part of the user.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a sectional view taken on the line 2—2 of FIGURE 1;

FIGURE 3 is a sectional view taken on the line 3—3 of FIGURE 1;

FIGURE 4 is a fragmentary perspective view showing one suggested way of attaching the dispenser to the top part of a conventional ice cream container;

FIGURE 5 is a sectional view taken on the line 5—5 of FIGURE 1; and,

FIGURE 6 is a sectional view taken on the line 6—6 of FIGURE 5.

Figure 1:
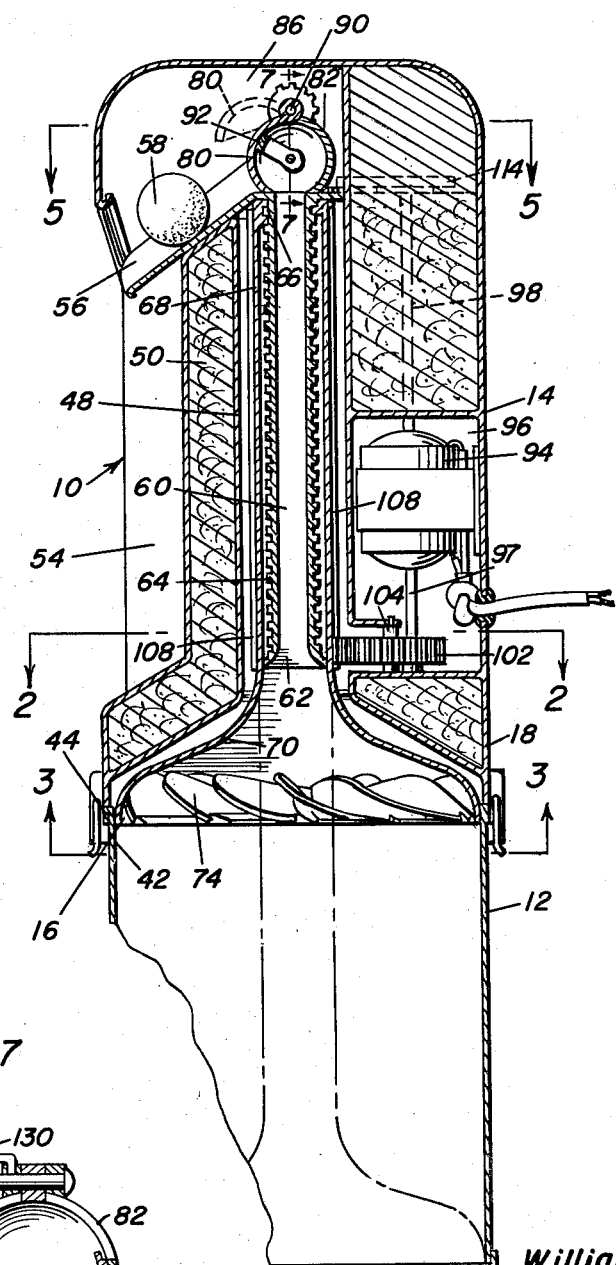
FIGURE 1 is a sectional view of the power-driven ice cream dispenser.
Figure 7:
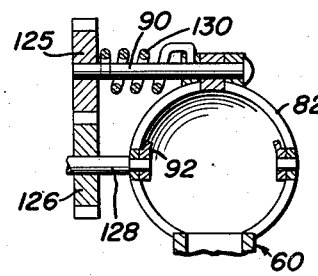
FIGURE 7, is a partial sectional view taken substantially through a plane indicated by section line 7—7 in FIGURE 1.

In the accompanying drawings there is an ice cream dispenser 10 shown mounted on the open top of a conventional ice cream container 12. The ice cream container is the type of container in which bulk ice cream is now available.

Dispenser 10 is made of a body or housing 14 with an open lower end 16. There is an outer wall 18 constituting part of the housing, and this has a strap 20 circumferentially mounted and secured thereon. An over-center toggle latch 22 consisting of a toggle link 24 and bail 26, is connected between ends 30 and 32 of strap 20. Link 24 is connected by hinge 34 to end 32, and bail 26 is connected by hinge 36 to strap end 30. The link is equipped with a locking tongue 40 beneath which a part of the bail engages to form an over-center toggle latch by which to engage the upper open end of container 12 with the lower open end 16 of the housing wall 18. Short projections 42 on the inner lower part of the surface of strap 20 engage beneath the rim 44 of container 12 to hold the container assembled with the lower end of the dispenser 10.

The wall construction of the housing is essentially a double wall arrangement with outer wall 18 together with inner wall 48 so that insulation 50 may be placed therebetween. The insulation is necessary or at least desirable, to maintain the ice cream in a cool condition. The wall structure has a vertical recess 54 beneath discharge spout 56 so as to enable the user to place a container, ice cream cone, etc. beneath the spout 56 to receive a portion 58 of ice cream.

There is a central delivery tube 60 in the housing 14. The central delivery tube is fixed and has an outwardly tapered entrance 62 at the lower end. The lower end of delivery tube 60 is spaced from the lowermost extremity of the housing wall 18, and it has an exterior or external thread 64 thereon. A nut 66 is in engagement with thread 64 and is formed on the inner upper part of rotor tube 68. The rotor tube is concentrically mounted around delivery tube 60 and has a bell 170 at its lower end to which a plurality of ice cream skimming blades 74 are secured. The bell 70 is made of a dimension to fit snugly within the confines of the side wall of container 12, and the purpose of the skimming blades 74 is to shave ice cream from the top of the ice cream in container 12 and to deliver it through delivery tube 60.

The upper end of the delivery tube 60 is registered with a compartment 78 formed by a pair of semi-spherical formers or molds such as semi-spherical members 80 and 82. Discharge spout 56 is stationarily attached to a part of the wall structure of the housing and has a recess 86 in the top part thereof which is occupied by members 80 and 82. Movable member 80 and stationary member 82 confront each other as shown in FIG. 1, while ice cream is being discharged therein from delivery tube 60. However, when the pressure of the ice cream exceeds a determinable pressure level, the member 80 is pivotally operated with the supporting shaft 90 thereof, and this enables the rotary slicer 92 to discharge the portion 58 of ice cream into the discharge spout 56, as will subsequently appear.

An electric motor 94 is mounted in a motor cavity 96 in the housing and has a double shaft 97 and 98 extending from the opposite ends thereof. Shaft 97 drives a pinion 100 which is in engagement with gear 102. Gear 102 is mounted for rotation on a shaft 104, the latter being supported by bearings in a pair of walls of the wall structure of the housing. Elongate gear teeth 108 are on the outside surface of tube 68 so that upon energization of the motor 94 the tube 68 is rotated thereby causing it to move downward a very slight distance into container 12 and cause blades 74 to shave ice cream from the container.

Shaft 98 of motor 94 has a gear 114 attached to the upper end and this is engaged by a spindle supported pinion enmeshed with gear 118 secured to shaft 119. Mitre gears 120 and 121 secured to shafts 119 and 128, respectively, establish a drive connection between shafts 119 and 128, the latter being mounted by support bracket 122 in recess 86. Former member 80 is secured to shaft 90, and there is a mutilated gear 125 also secured to the same shaft. Adjacent mutilated gear 126 is secured to shaft 128 to which slicer 92 is secured. Shaft 128 is supported by a bearing in bracket 122 alongside of the former members 80 and 82, positioning the slicer within the cavity enclosed by members 80 and 82. Shaft return spring 130 is secured to shaft 90 or gear 125 and to the stationary former 82, and the purpose of the spring is to keep former 80 closed and the mutilated gears 125 and 126 disengaged.

The operation of this part of the ice cream dispenser is as follows: Shaft 128 continually rotates together with slicer 92 connected thereto while ice cream is being compacted between members 80 and 82. When the pressure in members 80 and 82 is sufficient to overcome the closing force of spring 130 biasing member 80 in a counterclockwise direction to the position illustrated in FIGURE 1 by solid lines, member 80 opens slightly enough to angularly displace the mutilated gear 125 in a clockwise direction to enable engagement of gear 125 with gear 126 and cause shaft 90 to be further rotated to open completely member 80. At that time the continuously rotating slicer 92 separates ice cream portion 58 from the member 82 and discharges it down spout 56. When the mutilated gears become disengaged, the ice cream will have been removed from the former members cavity, and spring 130 returns the member 80 to the closed position (FIGURE 1).

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An ice cream dispenser adapted to be attached to an ice cream container, said dispenser comprising a housing, an ice cream delivery rotor rotatably mounted in said housing shaving veins mounted on said rotor for engaging the ice cream at one end of the housing, said rotor including a rotor tube communicating with said shaving veins, a delivery tube concentrically mounted within said rotor tube and through which the ice cream is propelled by the rotor, forming means operatively mounted on a discharge end of said delivery tube for forming the ice cream, and means operatively connected to said forming means and rotor for discharging the formed ice cream therefrom in response to delivery of a predetermined amount of ice cream to the forming means by the rotor.

2. In an ice cream dispenser, the combination of a housing having an inlet end, a delivery tube mounted in said housing, a rotor rotatably mounted in said housing having an ice cream inlet in communication with said delivery tube, drive means operatively connected to said rotor for actuation thereof, means on said rotor for delivering ice cream into said delivery tube in response to actuation of said rotor and dispensing means drivingly connected to said drive means for dispensing ice cream from said delivery tube in response to delivery of a predetermined amount of ice cream to the dispensing means by the rotor.

3. The combination of claim 2 wherein said dispensing means includes, ice cream forming means mounted on said delivery tube and into which ice cream is compacted in response to rotor rotation, said forming means including a pair of formers, means mounting one of said formers for movement relative to the other to open the formers and enable the ice cream to be moved from between said formers, means movably mounted in the other of said formers and for propelling the formed ice cream from the space occupied by the ice cream within said formers.

4. The combination of claim 2, wherein said dispensing means comprises ice cream forming means mounted on said delivery tube for receiving ice cream from the delivery tube and ejection means mounted on the forming means and drivingly connected to the drive means and operative in response to a predetermined pressure of ice cream received within the forming means to eject the ice cream from the forming means.

5. The combination of claim 4 wherein said ejection means includes a continuously rotating slicer drivingly connected to the drive means mounted within the forming means and intermittent gear means operatively connected to the forming means for positive opening thereof in response to opening displacement of the forming means by ice cream pressure against a closing bias on the forming means.

References Cited in the file of this patent

UNITED STATES PATENTS

| 1,544,802 | Burkeman | July 7, 1925 |
|---|---|---|
| 1,638,134 | Whiteside | Aug. 9, 1927 |
| 1,758,028 | Brown | May 13, 1930 |
| 1,770,739 | Lush et al. | July 15, 1930 |
| 2,385,579 | King et al. | Sept. 25, 1945 |